US006297885B1

(12) United States Patent
Murakami

(10) Patent No.: US 6,297,885 B1
(45) Date of Patent: Oct. 2, 2001

(54) IMAGE INPUT-OUTPUT APPARATUS

(75) Inventor: Atsushi Murakami, Nagoya (JP)

(73) Assignee: Broher Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/195,166

(22) Filed: Nov. 18, 1998

(30) Foreign Application Priority Data

Nov. 19, 1997 (JP) .................................................. 9-318240

(51) Int. Cl.[7] .................................................. G06K 15/00

(52) U.S. Cl. .............................................. 358/1.1; 358/471

(58) Field of Search ........................... 358/1.1, 471, 474, 358/472, 488, 496, 497

(56) References Cited

U.S. PATENT DOCUMENTS 4,789,903 * 12/1988 Kamada .............................. 358/296

FOREIGN PATENT DOCUMENTS 63-81562 4/1988 (JP) .
1-165261 6/1989 (JP) .
5-131709 5/1993 (JP) .
5-244398 9/1993 (JP) .
5-252383 9/1993 (JP) .
5-328104 12/1993 (JP) .
7-74930 3/1995 (JP) .
7-327129 12/1995 (JP) .
8-331370 12/1996 (JP) .

* cited by examiner

*Primary Examiner*—Jerome Grant, II
(74) *Attorney, Agent, or Firm*—Oliff & Berridge, PLC

(57) ABSTRACT

An image input-output apparatus includes a housing which is internally provided with a common transfer path. Further, the housing internally incorporates a transfer mechanism for selectively transferring a document and a recording paper along the common transfer path, a combination of an image reading light source and an image sensor for optically reading an image of the document moving along the common transfer path, and a printing unit for printing an image on the recording paper moving along the common transfer path. The width of the recording paper may be detected by a combination of a width detecting light source and the image sensor.

17 Claims, 3 Drawing Sheets

A
A1
W
1
1a
2
3
3a
4
4a
4b
5a
5b
5c
5d
5e
5f
5g
6
6a
6b
6c
7
7a
7b
7c
7d
M
R

IMAGE INPUT-OUTPUT APPARATUS

BACKGROUND OF THE INVENTION

1. Field of the Invention

The present invention relates to an image input-output apparatus of the type which has a common transfer path for selectively transferring a document and a recording paper.

2. Description of the Related Art

An example of image input-output apparatus is a multi-function apparatus which provides an image reading function and an image printing function under the control of an outside computer such as personal computer. Another example of image input-output apparatus is a facsimile machine.

There are two types of image input-output apparatuses. A first type of image input-output apparatus has two different transfer paths for separately transferring a document and a recording paper, wherein an image reader is provided along the document transfer path while a printing unit is provided along the recording paper transfer path. A second type of image input-output apparatus has a common transfer path for selectively transferring a document and a recording paper, wherein an image reader and a printing unit are equally arranged long the common transfer path.

In either type of the image input-output apparatuses described above, a document width detector is provided in a document container for detecting the width of the document, whereas a recording paper width detector is provided in a recording paper container for detecting the width of the recording paper. Therefore, the need for providing the two separate width detectors increases the manufacturing cost of the image input-output apparatus as a whole while also increasing the total number of required components to result in increasing the assembly steps.

SUMMARY OF THE INVENTION

It is, therefore, an object of the present invention to provide an image input-output apparatus which is capable of detecting the width of a recording paper without using a separate sensor specially dedicated to that purpose.

Another object of the present invention is to provide an image input-output apparatus which is capable of conveniently performing a copying operation even if the width of a recording paper is different from that of a document.

According to a first aspect of the present invention, an image input-output apparatus comprises a common transfer path, a transfer mechanism for selectively transferring a document and a recording paper along the common transfer path, a reading unit including an image sensor for optically reading an image of the document moving along the common transfer path, and a printing unit for printing an image on the recording paper moving along the common transfer path. Further, a paper width detector, which partially includes the image sensor, is provided upstream from the printing unit for detecting a width of the recording paper.

With the above-described image input-output apparatus, the image sensor is utilized not only for reading the image of the document but also for detecting the width of the recording paper. Therefore, there is no need for providing a separate sensor exclusively dedicated for the width detection of the recording paper. As a result, the number of components can be correspondingly reduced, which leads to a cost reduction and facilitates assembly of the apparatus.

According to a preferred embodiment, the reading unit further includes an image reading light source for irradiating an image carrying surface of the document with light, so that the image sensor receives the light reflected on the image carrying surface for detecting the image carried on the document. Further, the paper width detector further includes a width detecting light source provided in the reading unit in opposed relation to the image sensor for irradiating the recording paper with light, whereby the light from the width detecting light source is partially interrupted by the recording paper but partially allowed to reach the image sensor for thereby detecting the width of the recording paper.

The image sensor may, typically but not exclusively, includes a multiplicity of image pickup or photoelectric devices such as CCDs (charge-coupled devices). Each of the image reading light source and the width detecting light source may, typically but not exclusively, includes a plurality of LEDs (light emitting diodes) or a cold cathode tube.

The image reading light source and the image sensor may be arranged below the common transfer path, whereas the width detecting light source may be arranged above the common transfer path in opposed relation to the image sensor. Alternatively, the image reading light source and the image sensor may be arranged above the common transfer path, whereas the width detecting light source may be arranged below the common transfer path in opposed relation to the image sensor.

The image input-output apparatus may further comprise a document container for containing the document, a recording paper container separate from the document container for containing the recording paper, a first feed mechanism for feeding the document into the common transfer path from the document container, and a second feed mechanism for feeding the recording paper into the common transfer path from the recording paper container. Such a structure makes it possible to set the document and the recording paper at the same time for copying purposes. In this case, further, the document container may be provided with a document width detector for detecting a width of the document.

The image input-output apparatus may further comprise light source switching means for selectively turning on or off the image reading light source and the width detecting light source. Specifically, the light source switching means turns on the image reading light source while turning off the width detecting light source when the document is transferred along the common transfer path. On the other hand, the light source switching means turns on the width detecting light source while turning off the image reading light source when the recording paper is transferred along the common transfer path.

Additionally or alternatively, the image input-output apparatus may further comprise image size altering means for reducing or enlarging the image depending on the detected width of the recording paper before printing the image on the recording paper.

In case where the image input-output apparatus is provided with a document width detector for detecting a width of the document, it may further comprise copying control means for automatically performing the successive steps of causing the document width detector to detect the width of the document, causing the reading unit to read the image of the document for storage, causing the paper width detector to detect the width of the recording paper, altering the stored image in size depending on comparison of the detected width of the recording paper with the detected width of the document, and causing the printing unit to print the size-altered image on the recording paper.

In either case, the light source switching means, the image size altering means or the copying control means may be realized by a micro computer which include a CPU (central processing unit), a ROM (read-onlymemory) and a RAM (random access memory) Further, the printing unit may preferably comprise an ink jet printhead.

According to a second aspect of the present invention, there is provided an image input-output apparatus comprising: a common transfer path; a transfer mechanism for selectively transferring a document and a recording paper along the common transfer path; an image reader for optically reading an image of the document moving along the common transfer path, the image reader including an image reading light source and an image sensor; a document width detector for detecting a width of the document before the document is transferred to the image reader; a printing unit provided downstream from the image reader for printing an image on the recording paper moving along the common transfer path; and a paper width detector provided upstream from the printing unit for detecting a width of the recording paper; wherein the paper width detector includes a combination of the image sensor and a width detecting light source arranged in opposed relation to the image sensor.

The image reading light source and the image sensor may be arranged below the common transfer path, whereas the width detecting light source being arranged above the common transfer path. Alternatively, the image reading light source and the image sensor may be arranged above the common transfer path, whereas the width detecting light source being arranged below the common transfer path.

In a preferred embodiment of the second aspect, the image input-output further comprises a document container for containing the document, a recording paper container separate from the document container for containing the recording paper, a first feed mechanism for feeding the document into the common transfer path from the document container, and a second feed mechanism for feeding the recording paper into the common transfer path from the recording paper container. The document width detector may be preferably provided at the document container.

The image input-output apparatus may further comprise light source switching means for selectively turning on or off the image reading light source and the width detecting light source. Specifically, the light source switching means turns on the image reading light source while turning off the width detecting light source when the document is transferred along the common transfer path. On the other hand, the light source switching means turns on the width detecting light source while turning off the image reading light source when the recording paper is transferred along the common transfer path.

Additionally or alternatively, the image input-output apparatus may further comprise image size altering means for reducing or enlarging the image depending on the detected width of the recording paper before printing the image on the recording paper.

Further, the image input-output apparatus may further comprise copying control means for automatically performing the successive steps of causing the document width detector to detect the width of the document, causing the image reader to read the image of the document for storage, causing the paper width detector to detect the width of the recording paper, altering the stored image in size depending on comparison of the detected width of the recording paper with the detected width of the document, and causing the printing unit to print the size-altered image on the recording paper.

In either case, the light source switching means, the image size altering means or the copying control means may be preferably realized by a micro computer which includes a CPU, a ROM and a RAM.

Other objects, features and advantages of the present invention will become apparent from the following description of the preferred embodiment given with reference to the accompanying drawings.

DETAILED DESCRIPTION OF THE PREFERRED EMBODIMENT

A preferred embodiment of the present invention will be described below with reference to the accompanying drawings.

Figure 1:
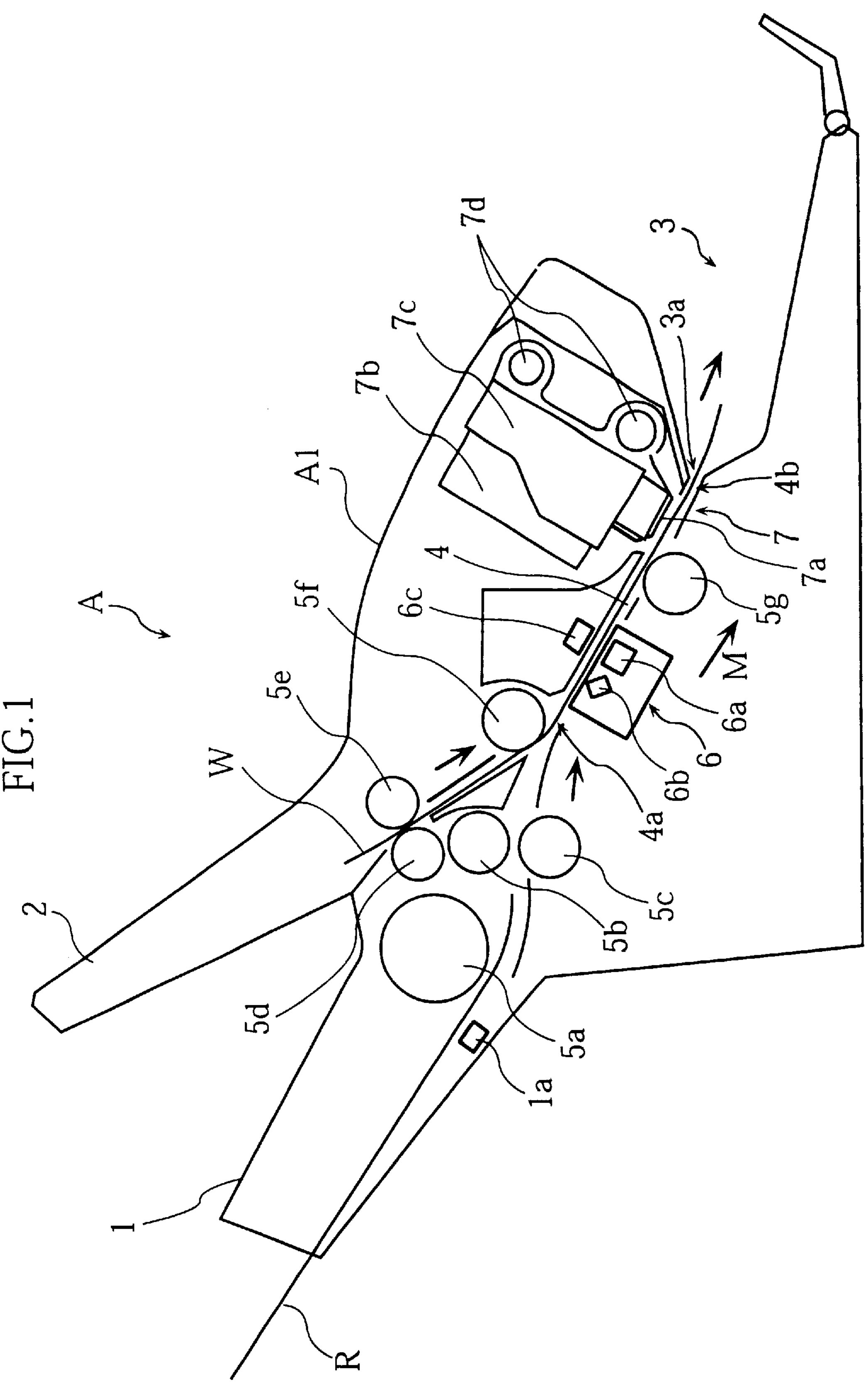
FIG. 1 is a schematic side view showing an image input-output apparatus embodying the present invention.

Reference is first made to FIG. 1 which schematically shows the overall arrangement of an image input-output apparatus embodying the present invention. The image input-output apparatus generally designated by reference sign A comprises a casing A1 provided with a document tray 1, a recording paper tray 2, and a paper discharge tray 3. Further, the housing Al is internally provided with a common transfer path 4, a plurality of transfer rollers 5*a*~5*g*, a reading unit 6, a printing unit 7, and a control unit 8 (see FIG. 2) to be described hereinafter.

The image input-output apparatus A, which has an image reading function and a printing function, may be connected to a personal computer and a telephone line to work as a multi-function machine which also provides a facsimile communication function. In operation, the transfer path 4 is commonly utilized for transferring a document R and a recording paper W. According to the illustrated embodiment, the document R is transferred with its image carrying surface directed downward, whereas the recording paper W is transferred with its recording surface directed upward. Further, the transfer direction M is lengthwise of the document R (and the recording paper W as well), so that the widthwise direction extends transversely to the transfer direction M.

Figure 2:
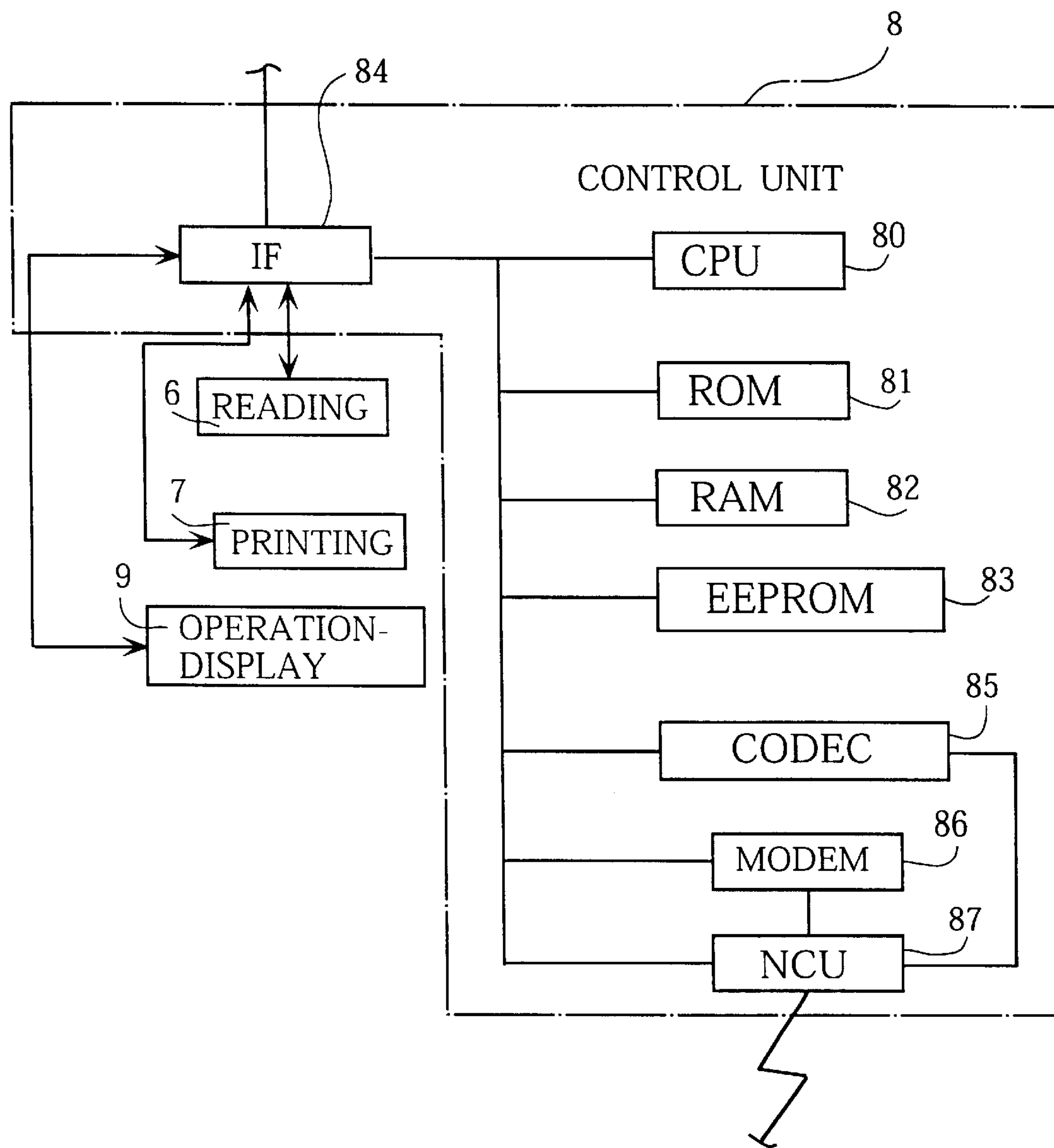
FIG. 2 is a circuit block diagram showing a control unit of the same image input-output apparatus.

The document tray 1 contains documents R (only one shown) to be subsequently read by the reading unit 6. Each document R is fed into the common transfer path 4 by the transfer rollers 5*a*~5*c* (feed rollers for the document R). The document tray 1 is internally provided with a document width detector 1*a* which is movable widthwise of the document R for detecting the width thereof. The detected width of the document R is transmitted to the control unit 8 (FIG. 2).

The recording paper tray 2 contains recording papers W which are subsequently subjected to printing at the printing unit 7. Each recording paper W is fed into the common transfer path 4 by the transfer rollers 5*d*, 5*e* (feed rollers for the recording paper W).

The common transfer path 4 communicates with a paper discharge opening 3*a* of the housing A1 which, in turn, is followed by the paper discharge tray 3 for receiving the document R after the image reading or the recording paper W after the printing.

The common transfer path 4 starts at a position 4*a* where the respective feed paths for the document R and the recording paper W join. Further, the common transfer path 4 terminates at a position 4*b* which substantially coincides with the paper discharge opening 3*a*. The transfer roller 5*f* is located at or near the starting position 4*a* of the common transfer path 4 as a first common transfer roller. The transfer roller 5*g* is located between the starting and terminal positions 4*a*, 4*b* of the common transfer path 4 as a second common transfer roller. Thus, each of the document R and the recording paper W is commonly transferred by the first and second common transfer rollers 5*f*, 5*g* along the common transfer path 4 in the course of the reading operation or the printing operation.

The reading unit 6 is located between the first and second common transfer rollers 5*f*, 5*g*. The reading unit 6 includes a image sensor 6*a*, an image reading light source 6*b* and a width detecting light source 6*c*.

The image sensor 6*a* is elongate widthwise of the document R or the recording paper W and comprises a multiplicity of image pickup elements such as CCDs (charge-coupled devices) in combination with an optical lens system. In the illustrated embodiment, the image sensor 6*a* is arranged below the common transfer path 4 to face the image carrying surface of the document R.

The image reading light source 6*b* comprises LEDs (light emitting diodes) for example for irradiating the document R with light over the entire width thereof in the course of the image reading operation. In the illustrated embodiment, the image reading light source 6*b* is disposed below the common transfer path 4 to face the image carrying surface of the document R as is the case with the image sensor 6*a*. Thus, the light from the image reading light 6*b* is reflected on the image carrying surface of the document R for incidence to the image sensor 6*a* which thereby recognizes the image carried on the document R.

The width detecting light source 6*c* may also comprise LEDs for example for irradiating the recording paper W with light in the course of the printing operation. Unlike the image reading light source 6*b*, the width detecting light source 6*c* is located above the common transfer path 4 in opposed relation to the image sensor 6*a*. Thus, a portion of the light from the width detecting light source 6*c* can reach the image sensor 6*a*, whereas the remaining portion of the light interrupted by the recording paper W cannot reach the image sensor 6*a*. In this way, the width of the recording paper W can be detected by the combination of the image sensor 6*a* and the width detecting light source 6*c*.

The detection signals from the image sensor 6*a* with respect to the image carried on the document R and the width of the recording paper W are transmitted to the control unit 8 (FIG. 2), as described hereinafter. Further, the control unit 8 controls the image reading light source 6*b* and the width detecting light source 6*c* in such a manner that the image reading light source 6*b* is turned on at the time of image reading while the width detecting light source 6*c* is turned on at the time of printing.

The printing unit 7 is located between the reading unit 6 and the paper discharge opening 3*a*. The printing unit 7 includes a printhead 7*a*, an ink cartridge 7*b*, a carriage 7*c*, and a pair of guide rails 7*d*.

The printhead 7*a*, which is integrated with the ink cartridge 7*b* and/or the carriage 7*c*, performs printing relative to the recording paper W by ink jets. The ink cartridge 7*b* is replaceably mounted on the carriage 7*c* which, in turn, is slidably movable along the pair of guide rails 7*d* (i.e., widthwise of the recording paper W) by means of a drive motor (not shown) and a transmission belt (not shown).

As shown in FIG. 2, the control unit 8, working as a micro computer, includes a CPU (central processing unit) 80, a ROM (read-only memory) 81, a RAM (random access memory) 82, an EEPROM (electrically erasable and programmable ROM) 83, an interface 84, a codec (coder-decoder) 85, a modem (modulator-demodulator) 86, and an NCU (network control unit) 87. The CPU 80, the ROM 81, the RAM 82, the EEPROM 83, the interface 84, the codec 85, the modem 86 and the NCU 87 are connected to each other via bus lines (digital lines) which include data bus lines, address bus lines and control signal bus lines. The interface 84 is connected to the reading section 6 and the printing section 7. The interface 84 is also connected to an operation-display section 9 while also being connectable to a personal computer (not shown).

The CPU 80 provides an overall control of the image input-output apparatus A as a whole.

The ROM 81 stores various programs or the like as required for controlling the image input-output apparatus A.

The RAM 82 stores digital data such as image data and accompanying attribute data. Of course, an additional RAM or RAMs may be provided to increase the capacity of data storage.

The EEPROM 83 stores registered data (e.g. shortcut dials) and/or flags.

The interface 84 controls data transmission of the CPU 80 to and/or from the reading section 6, the printing section 7 and the operation-display section 9.

The codec 85 performs coding of the transmitting image data and decoding of the received image data, for example, in the fax communication mode.

The modem 86 modulates the transmitting codes and demodulates the received codes.

The NCU 87 is connected to a telephone line for providing network control. The NCU 87 is also connected to the codec 85 and the modem 86 through an analog line, respectively.

The operation-display unit 9 is an user-interface which is provided with various key switches and a display panel for suitably setting the operation of the image input-output apparatus A and for confirming the operation thereof.

Figure 3:
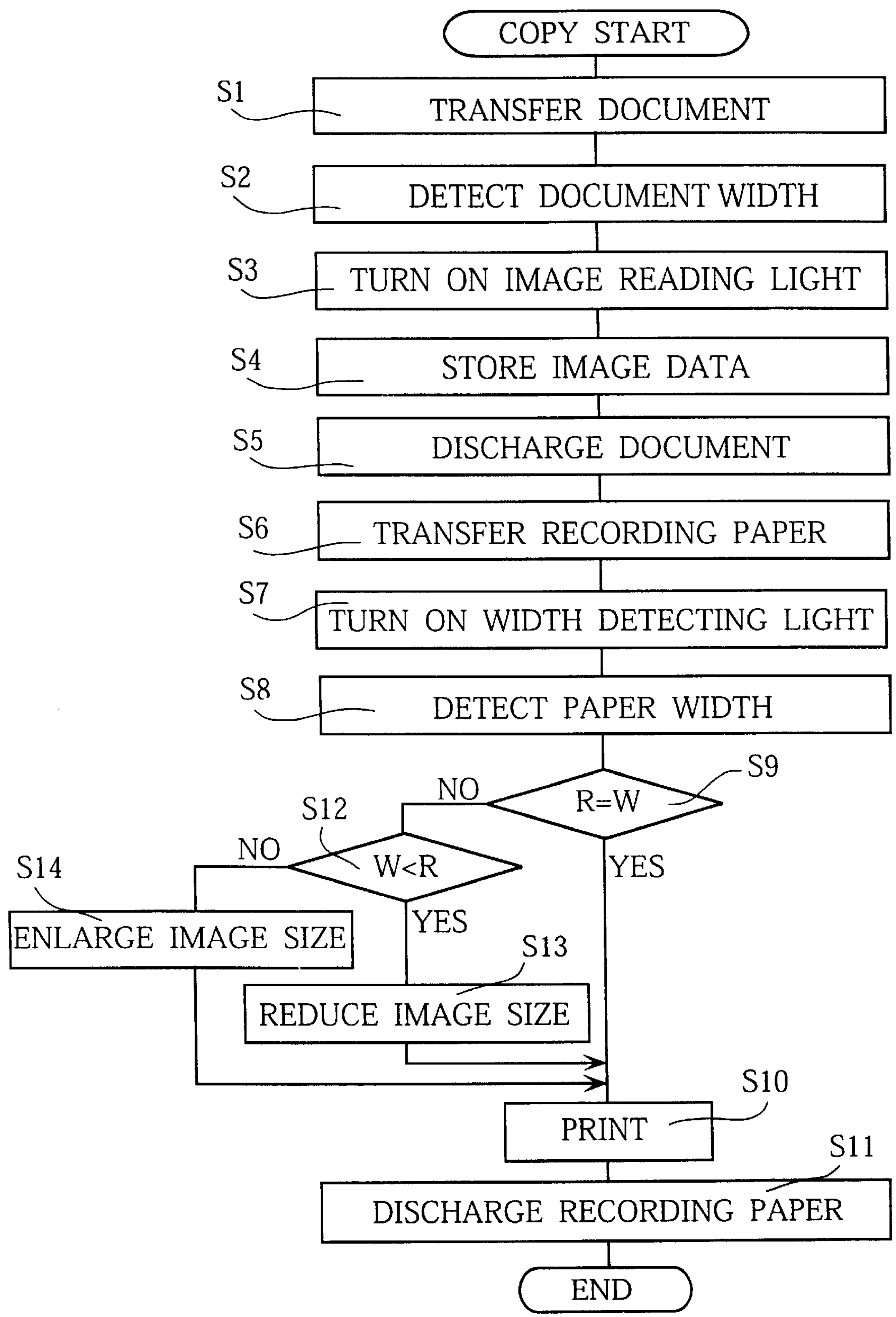
FIG. 3 is a flowchart illustrating the successive steps of the copying operation performed by the same image input-output apparatus.

Next, a copying operation performed by the above-described image input-output apparatus A is described with reference to the flowchart of FIG. 3.

If the user selects a copying mode by pushing a predetermined key switch at the operation-display unit 9 (FIG. 2), the CPU 80 causes the document feed rollers 5*a*~5*c* and the common transfer rollers 5*f*, 5*g* to start rotating. As a result, the document R at the document tray 1 is fed into the common transfer path 4 (Step S1).

At this time, the document width detector 1*a* detects the width of the document R and sends the detected width to the CPU 80 which causes the RAM 82 to store the detected width (Step S2).

Then, as the document R enters the common transfer path 4, the CPU 80 causes the image reading light source 6*b* to turn on (Step S3).

As the document R is transferred across the image sensor (image sensor) 6*a*, the light from the image reading light source 6*b* is reflected on the image carrying surface of the document R for incidence to the image sensor 6*a*. The output (detection signals) from the image sensor 6*a* is transmitted to the CPU 80 which causes the RAM 82 to store the detection signals as image data (Step S4).

When the document R is transferred past the image sensor 6, the CPU 80 then causes the image reading light source 6*b* to turn off as the document R is discharged onto the paper discharge tray 3 (Step S5).

Then, the CPU 80 causes the recording paper feed rollers 5*d*, 5*e* to rotate for feeding the recording paper W into the common transfer path 4 (Step S6).

As the recording paper W enters the common transfer path 4, the CPU 80 then causes the width detecting light source 6*c* to turn on (Step S7).

As the recording paper W is transferred over the image sensor 6*a*, the light from the width detecting light source 6*c* is partially interrupted while also being allowed to partially enter the image sensor 6*a*. As a result, the image sensor 6*a* detects the width of the recording paper (Step S8). The output (detection signals) from the image sensor 6*a* is transmitted to the CPU 80 which causes the RAM 82 to store the detection signals as paper width data.

Then, the CPU 80 determines whether the width of the document R detected in Step S2 is equal to the detected width of the recording paper W (Step S9).

If "YES" in Step S9, the CPU 80 transmits the image data (previously stored in the RAM 82 in Step S4) to the printing unit 7 without any size alteration. As a result, the printing unit 7 performs actual-size image printing on the recording paper W on the basis of the non-altered image data as the latter is transferred across the printhead 7*a* (Step S10).

When the recording paper W is transferred completely past the printhead 7*a*, the CPU 80 terminates the copying routine after causing the second common transfer roller 5*g* to discharge the recording paper W onto the paper discharge tray 3 (Step S11). At this time, the CPU 80 has already caused the width detecting light source 6*c* to turn off.

In Step S9, if the document width is not equal to the recording paper width ("NO" in Step S9), the CPU 80 then determines whether the recording paper width is smaller than the document paper width (Step S12).

If "YES" in Step S12, the CPU 80 reads out the image data from the RAM 82 and processes them for a size reduction suitable for subsequent printing on the recording paper W (Step S13). As a result, the printing unit 7 performs reduced-size image printing on the recording paper W on the basis of the reduced image data as the latter is transferred across the printhead 7*a* (Step S10). In this way, it is possible to prevent the printhead 7*a* from jetting the ink outside the recording paper W to contaminate the common transfer path 4 and the nearby components.

On the other hand, if the recording paper width is found to be larger than the document width ("NO" in Step S12), the CPU 80 reads out the image data from the RAM 82 and processes them for a size enlargement suitable for subsequent printing on the recording paper W (Step S14). As a result, the printing unit 7 performs enlarged-size image printing on the recording paper W on the basis of the enlarged image data as the latter is transferred across the printhead 7*a* (Step S10).

As described above, the image sensor 6*a* used for reading the image of the document R is also utilized for detecting the width of the recording paper W in combination with the width detecting light source 6*c*. Thus, there is no need for providing a separate sensor (at the recording paper tray 2 for example) for detecting the width of the recording paper W. As a result, the overall number of the required components is reduced, which leads to a cost reduction.

Further, according to the preferred embodiment, the common transfer path 4 is equally utilized for transferring the document R and the recording paper W. As a result, the image input-output apparatus A may be simplified in structure and reduced in size.

According to the preferred embodiment, the combination of the image sensor 6*a* and the image reading light source 6*b* provides an image reader for optically reading the image of the document R, whereas the combination of the image sensor 6*a* and the width detecting light source constitutes a paper width detector for detecting the width of the recording paper W. Further, the control unit 8 provides the following functions.

First, the control unit 8 serves as a light source switching means for selectively turning on or off the image reading light source 6*b* and the width detecting light source 6*c* depending on whether the image reading operation or the image printing operation is performed.

Secondly, the control unit 8 functions as an image size altering means for reducing or enlarging the image before printing on the recording paper W depending on the width thereof detected by the paper width detector.

In the third place, the control unit 8 works as a copying control means for automatically performing the successive steps of causing the document width detector 1*a* to detect the width of the document R, causing the image reader to read the image of the document R, causing the paper width detector to detect the width of the recording paper W, causing the image size altering means to reduce or enlarge the size of the read image depending on the comparison of the recording paper width with the document width, and causing the printing unit 7 to print the reduced or enlarged image on the recording paper W.

In the illustrated embodiment, the printhead 7*a* is an ink jet print head. However, the type of the printhead 7*a* is not at all limitative. For instance, the printhead 7*a* may be a thermal printhead. Further, the printing unit 7 as a whole may be constituted as an electrophotographic printing unit.

In the illustrated embodiment, the printing operation is described as a part of the copying process. However, the same printing operation including Steps S6~S14 may be carried out in printing the image data which are received from a personal computer or through the telephone line.

The preferred embodiment of the present invention being thus described, it is obvious that the same may be varied in many ways. Such variations should not be regarded as a departure from the spirit and scope of the present invention, and all such variations as would be obvious to those skilled in the art are intended to be included in the scope of the following claims.

What is claimed is:

1. An image input-output apparatus comprising:

a common transfer path;

a transfer mechanism for selectively transferring a document and a recording paper along the common transfer path;

a reading unit for optically reading an image of the document moving along the common transfer path, the reading unit including an image reading light source and an image sensor;

a printing unit for printing an image on the recording paper moving along the common transfer path; and a paper width detector provided upstream from the printing unit for detecting a width of the recording paper, wherein the paper width detector includes a combination of the image sensor and a width detecting light source arranged in opposed relationship to the image sensor, and wherein the image reading light source and the image sensor are arranged on an image reading side of the common transfer path, the width detecting light source being arranged on an opposite side of the common transfer path.

2. The image input-output apparatus according to claim 1, wherein the image reading light source irradiates an image carrying surface of the document with light, the light reflected on the image carrying surface being incident to the image sensor, the width detecting light source irradiates the recording paper with light, the light from the width detecting light source being partially interrupted by the recording paper but partially allowed to reach the image sensor for thereby detecting the width of the recording paper.

3. The image input-output apparatus according to claim 2, wherein the image reading light source and the image sensor are arranged below the common transfer path, the width detecting light source being arranged above the common transfer path in opposed relation to the image sensor.

4. The image input-output apparatus according to claim 2, further comprising light source switching means for selectively turning on or off the image reading light source and the width detecting light source, wherein the light source switching means turns on the image reading light source while turning off the width detecting light source when the document is transferred along the common transfer path, and wherein the light source switching means turns on the width detecting light source while turning off the image reading light source when the recording paper is transferred along the common transfer path.

5. The image input-output apparatus according to claim 1, further comprising:

a document container for containing the document;

a recording paper container separate from the document container for containing the recording paper;

a first feed mechanism for feeding the document into the common transfer path from the document container; and a second feed mechanism for feeding the recording paper into the common transfer path from the recording paper container.

6. The image input-output apparatus according to claim 5, wherein the document container is provided with a document width detector for detecting a width of the document.

7. The image input-output apparatus according to claim 1, further comprising image size altering means for reducing or enlarging the image depending on the detected width of the recording paper before printing the image on the recording paper.

8. The image input-output apparatus according to claim 1, further comprising:

a document width detector for detecting a width of the document; and copying control means for automatically performing the successive steps of causing the document width detector to detect the width of the document, causing the reading unit to read the image of the document for storage, causing the paper width detector to detect the width of the recording paper, altering the stored image in size depending on comparison of the detected width of the recording paper with the detected width of the document, and causing the printing unit to print the size-altered image on the recording paper.

9. The image input-output apparatus according to claim 1, wherein the printing unit comprises an ink jet printhead.

10. An image input-output apparatus comprising:

a common transfer path;

a transfer mechanism for selectively transferring a document and a recording paper along the common transfer path;

an image reader for optically reading an image of the document moving along the common transfer path, the image reader including an image reading light source and an image sensor;

a document width detector for detecting a width of the document before the document is transferred to the image reader;

a printing unit provided downstream from the image reader for printing an image on the recording paper moving along the common transfer path; and a paper width detector provided upstream from the printing unit for detecting a width of the recording paper, wherein the paper width detector includes a combination of the image sensor and a width detecting light source arranged in opposed relation to the image sensor, and wherein the image reading light source and the image sensor are arranged on an image reading side of the common transfer path, the width detecting light source being arranged on an opposite side of the common transfer path.

11. The image input-output apparatus according to claim 10, further comprising:

a document container for containing the document;

a recording paper container separate from the document container for containing the recording paper;

a first feed mechanism for feeding the document into the common transfer path from the document container; and a second feed mechanism for feeding the recording paper into the common transfer path from the recording paper container.

12. The image input-output apparatus according to claim 11, wherein the document width detector is provided at the document container.

13. The image input-output apparatus according to claim 10, further comprising light source switching means for selectively turning on or off the image reading light source and the width detecting light source, wherein the light source switching means turns on the image reading light source while turning off the width detecting light source when the document is transferred along the common transfer path, and wherein the light source switching means turns on the width detecting light source while turning off the image reading light source when the recording paper is transferred along the common transfer path.

14. The image input-output apparatus according to claim 10, further comprising image size altering means for reducing or enlarging the image depending on the detected width of the recording paper before printing the image on the recording paper.

15. The image input-output apparatus according to claim 10, further comprising copying control means for automatically performing the successive steps of causing the document width detector to detect the width of the document, causing the image reader to read the image of the document for storage, causing the paper width detector to detect the width of the recording paper, altering the stored image in size depending on comparison of the detected width of the recording paper with the detected width of the document, and causing the printing unit to print the size-altered image on the recording paper.

16. The image input-output apparatus according to claim 10, wherein the printing unit comprises an ink jet printhead.

17. An image input-output apparatus comprising:

a common transfer path;

a transfer mechanism for selectively transferring a document and a recording paper along the common transfer path;

an image reader for optically reading an image of the document moving along the common transfer path, the image reader including an image reading light source and an image sensor;

a document width detector for detecting a width of the document before the document is transferred to the image reader;

a printing unit provided downstream from the image reader for printing an image on the recording paper moving along the common transfer path;

a paper width detector provide d upstream from the printing unit for detecting a width of the recording paper, the paper width detector including a combination of the image sensor and a width detecting light source arranged in opposed relation to the image sensor; and light source switching means for selectively turning on or off the image reading light source and the width detecting light source, wherein the light source switching means turns on the image reading light source while turning off the width detecting light source when the document is transferred along the common transfer path, and wherein the light source switching means turns on the width detecting light source while turning off the image reading light source when the recording paper is transferred along the common transfer path.

* * * * *